(12) United States Patent
Stahlin et al.

(10) Patent No.: US 8,862,384 B2
(45) Date of Patent: Oct. 14, 2014

(54) SELF-LEARNING MAP ON THE BASIS OF ENVIRONMENT SENSORS

(75) Inventors: Ulrich Stahlin, Eschborn (DE); Thomas Grotendorst, Eschborn (DE)

(73) Assignee: Continental Teves AG & Co. OHG (DE)

( * ) Notice: Subject to any disclaimer, the term of this patent is extended or adjusted under 35 U.S.C. 154(b) by 591 days.

(21) Appl. No.: 12/990,255

(22) PCT Filed: Apr. 30, 2009

(86) PCT No.: PCT/EP2009/055295
§ 371 (c)(1),
(2), (4) Date: Oct. 29, 2010

(87) PCT Pub. No.: WO2009/133185
PCT Pub. Date: Nov. 5, 2009

(65) Prior Publication Data
US 2011/0047338 A1 Feb. 24, 2011

(30) Foreign Application Priority Data

Apr. 30, 2008 (DE) .................. 10 2008 021 781
Apr. 11, 2009 (DE) .................. 10 2009 017 731

(51) Int. Cl.
| | | |
|---|---|---|
| G01C 21/00 | (2006.01) | |
| H04W 4/04 | (2009.01) | |
| G06F 17/30 | (2006.01) | |
| G08G 1/0967 | (2006.01) | |
| G01C 21/28 | (2006.01) | |
| G01C 21/32 | (2006.01) | |
| H04L 29/08 | (2006.01) | |

(52) U.S. Cl.
CPC ............... *G01C 21/32* (2013.01); *H04W 4/046* (2013.01); *G06F 17/30241* (2013.01); *G08G 1/096791* (2013.01); *G01C 21/28* (2013.01); *H04L 67/12* (2013.01)
USPC ........................................... 701/409; 701/400

(58) Field of Classification Search
USPC .................. 701/1, 23–28, 300–302, 400–541
See application file for complete search history.

(56) References Cited

U.S. PATENT DOCUMENTS

| | | | | |
|---|---|---|---|---|
| 5,633,946 A | * | 5/1997 | Lachinski et al. ............ | 382/103 |
| 6,516,267 B1 | * | 2/2003 | Cherveny et al. ............. | 701/409 |

(Continued)

FOREIGN PATENT DOCUMENTS

| | | |
|---|---|---|
| DE | 199 16 967 C1 | 11/2000 |
| DE | 100 30 932 A1 | 1/2002 |

(Continued)

OTHER PUBLICATIONS

Zott, Christian.: Safespot—Technical Platforms and Local Dynamic Maps; Safespot Watch-Over Workshop; Stuttgart; Jan. 21-22, 2008; S. 1-26; [http://www.watchover-eu.org/download/WO_SF_workshop/015_SF_WO_workshop_Session_2.pdf] S. 10-19.

(Continued)

*Primary Examiner* — Bhavesh V Amin
(74) *Attorney, Agent, or Firm* — RatnerPrestia

(57) ABSTRACT

A self-learning map or a device for creating and storing a digital map for a transport unit on the basis of environmental sensors, vehicle-to-X communication and satellite navigation systems. The self-learning map and device create and store the digital map without the use of data from navigation maps. The obtained digital map is iteratively improved and can be used for the validity check of an existing digital map for a driver assistance system.

16 Claims, 1 Drawing Sheet

(56) References Cited

U.S. PATENT DOCUMENTS

| | | | |
|---|---|---|---|
| 7,518,533 B2* | 4/2009 | Mafune | 340/995.23 |
| 7,805,242 B2 | 9/2010 | Fujimoto | |
| 7,831,389 B2 | 11/2010 | Yamada | |
| 2002/0085095 A1 | 7/2002 | Janssen | |
| 2003/0125871 A1 | 7/2003 | Cherveny et al. | |

FOREIGN PATENT DOCUMENTS

| | | |
|---|---|---|
| DE | 100 65 593 | 7/2002 |
| DE | 102 58 470 A1 | 7/2004 |
| DE | 10 2005 008 185 A1 | 8/2006 |
| DE | 10 2007 006 870 A1 | 8/2007 |
| DE | 10 2007 003 147 A1 | 9/2007 |
| DE | 10 2008 012 661 A1 | 2/2009 |
| EP | 1 530 025 A2 | 5/2005 |
| GB | 2 405 204 A | 2/2005 |
| GB | 2 440 958 A | 2/2008 |
| WO | WO 2007/065725 A1 | 6/2007 |

OTHER PUBLICATIONS

Bartels, Christine; Safespot—Local Dynamic Maps in Cooperative Systems IP—"Smart Vehicles on Smart Roads" Maps & ADAS Workshop; Mar. 15, 2007; Paris; S. 2-21;[http://www.prevent-ip.org/download/Events/20070314l5_2nd_profusion_workshop/SessionF1_Bartels.pdf] S. 7,8, 12-15.

Amditis, Angelos; Prevent Fusion Forum E-Journal—vol. 2; Jan. 2008;[http://www.prevent-ip.org/download/Publications/Profusion_E-Journal_volume_2_Final.pdf] S. 31-35, 41-47, 48-58.

European Search Report corresponding to EP 9738229.5 dated Jan. 24, 2014.

\* cited by examiner

SELF-LEARNING MAP ON THE BASIS OF ENVIRONMENT SENSORS

CROSS REFERENCE TO RELATED APPLICATIONS

This application is the U.S. national phase application of PCT International Phase Application No. PCT/EP2009/055295, filed Apr. 30, 2009, which claims priority to German Patent application No. 10 2008 021 781.6, filed Apr. 30, 2008, and to German Patent application No. 10 2009 017 731.0, filed Apr. 11, 2009, the contents of such applications being incorporated by reference herein.

FIELD OF THE INVENTION

The invention relates to the creation of individually learning maps for means of transport. The invention also relates to an apparatus for creating and storing a digital map for a means of transport. In addition, the invention relates to a means of transport having an apparatus for creating and storing a digital map, a method, a program element and a computer-readable medium for creating and storing a digital map for a means of transport.

BACKGROUND OF THE INVENTION

Driver assistance systems for assisting a driver in driving a vehicle and navigation systems for routing a driver or a vehicle from a starting point to a desired destination may use digital maps.

A driver assistance system (Advanced Driver Assistance System, ADAS) horizon created by the navigation system, for example, may be used to transmit road profile, signage, etc. in the surroundings of the vehicle to driver assistance systems. In this case, it is possible to provide necessary digital map data, wherein the digital maps may be already stored in the navigation systems in the vehicle.

The data for the digital map may be fed into the navigation system by a vehicle manufacturer, for example using a CD.

The navigation for the vehicle is then effected on the basis of the stored digital maps.

SUMMARY OF THE INVENTION

An object of the invention may be regarded as being that of allowing safe operation of a means of transport.

The invention specifies an apparatus for creating and storing a digital map, a means of transport having such an apparatus and a method for creating and storing a digital map for a means of transport in accordance with the features described herein. Developments of the invention are embodied by the dependent claims.

In accordance with one exemplary embodiment of the invention, an apparatus for creating and storing a digital map for a means of transport having a sensor unit, a creation unit and a memory unit is specified. The sensor unit is designed to ascertain topographical data for the surroundings of the means of transport. The creation unit is designed to create the digital map from the ascertained topographical data for the surroundings of the means of transport. The memory unit is designed to store the created digital map.

Such an apparatus allows the stored digital map data to be used in safety-relevant applications, such as ADAS, and is helpful since the map data are up-to-date as a result of being created from individually ascertained data for the surroundings of the vehicle. In this case, the map data may be used as a basis for the actions of the ADAS. Hence, the map data may be used not only as an index but also separately as a basis for safety-relevant applications.

The vehicle may be a car, a bus, a motorcycle, a ship, a train, etc.

In accordance with a further exemplary embodiment of the invention, the apparatus is designed for iterative creation of the digital map.

Such an apparatus in which the digital map is created iteratively allows a digital map created when a route is first traveled to be refined by virtue of the same route being traveled a plurality of times or allows the quality of the existing digital map to be improved, since whenever the same route is traveled the sensor unit reascertains topographical data for the surroundings of the means of transport, from which data the creation unit may create an improved digital map.

In addition, whenever the same route is traveled it is possible for topographical data for the surroundings of the means of transport to be ascertained, wherein the creation unit may create an improved digital map from the ascertained topographical data for the surroundings of the means of transport. In this case, the topographical data for the surroundings of the means of transport which have been ascertained a plurality of times may be aligned with one another, in the same way as the digital maps created a plurality of times, which allows an improved digital map to be created with a higher level of quality. The digital maps stored in the process may be in the memory unit in the current form in each case.

In accordance with a further exemplary embodiment of the invention, the apparatus has a detection unit which is designed to detect a driving pattern for identifying a classified road situation for a digital map.

In this context, the detection unit may have a peripheral sensor system, an ESP sensor system, a radar sensor, a camera, a vehicle-to-X (C2X) communication unit and a satellite navigation receiver.

Such an apparatus having a detection unit allows the driving behavior of a user of the means of transport to be ascertained and stored by the apparatus for particular situations on the route to be traveled, for example, which allows the apparatus to recognize, by way of example, whether there is an obstacle on the route, such as roadworks or highway roadworks, since the driver is reducing his speed, or whether the reduction in the speed of the means of transport by the driver has been carried out on the basis of his specific driving behavior, for example before a bend in the road.

If an obstacle, such as roadworks or highway roadworks, occurs on the route to be traveled and the driver accordingly reduces his speed, the apparatus may use the detection unit to detect the speed reduction and may ask the driver whether the obstacle is roadworks or highway roadworks, for example, or whether there is an obstacle on the road. The driver may indicate whether there is an obstacle in front of him on the road and hence may confirm the presence of an obstacle. To the same extent, it is possible for further alterations in the route, such as sharp bends, diversions, etc., to be requested and to be confirmed by the driver.

In addition, such an apparatus with a detection unit allows the driver to be asked whether the previously recognized obstacle is a temporary change of route, for example, and when the obstacle will probably no longer be on the route, that is to say that the driver may confirm the validity period for the change. In this case, the apparatus stores in the digital map when the obstacle is removed and when the old course of the road without the obstacle and hence the old digital map is valid again.

Such an apparatus with a detection unit also allows a driver-specific driving pattern to be created, for example the driving behavior of the driver or the speed of the means of transport before an approaching bend or when there is an obstacle on the route or, in principle, the speeds outside of a locality or on a highway and also, by way of example, the speeds at particular times of day. In this case, the detection unit may ascertain the average speed in a region at a certain time of day and take this as a basis for customizing system thresholds, for example.

In addition, the apparatus with the detection unit may be designed to ascertain road type, road class, permitted direction of travel, etc., using data ascertained by the sensor and the speed of the means of transport and vehicle-to-X (C2X) data.

Such an apparatus allows the digital map to be customized relatively quickly to changes in the route.

Such an apparatus with a detection unit also allows the driver of a means of transport to assist the improvement in the quality of the created digital map, for example by being able to transmit information about obstacles or alterations in the route to the apparatus and hence being able to improve the digital map. The driver may therefore act as an additional "sensor" for ascertaining information from the surroundings of the means of transport which may be used to create the digital map.

In accordance with a further exemplary embodiment of the invention, an apparatus having a quality assessment unit is specified, wherein the quality assessment unit is designed to assess the quality of the ascertained topographical data for the surroundings of the means of transport and also the digital map created therefrom.

Such an apparatus with a quality assessment unit allows the digital map to be used for safety-relevant applications, such as driver assistance systems (ADAS), since individually created map-internal data may be used for the quality assessment. All data required for the quality assessment may be generated and stored by the apparatus itself, such as a time stamp. The individually ascertained data may be used as a basis for ADAS when the same route is traveled further.

In accordance with a further exemplary embodiment of the invention, the created digital map of the apparatus is designed for use by a driver assistance system or by driver assistance systems (ADAS).

Such an apparatus allows not only the digital map but also topographical data, ascertained by the apparatus, for the surroundings of the vehicle to be used for a driver assistance system.

Such an apparatus for use in safety-relevant applications allows the driver of a means of transport to be warned when the means of transport is at excessive speed, for example in a bend.

In line with a further exemplary embodiment of the invention, an apparatus having a communication unit is also specified, wherein the communication unit is designed to transmit the topographical data and the digital map to a suitable reception unit. By way of example, such a reception unit may be other people or means of transport, such as vehicles, which are able to take the transmitted data or the digital map as a basis for refining their own digital maps, for example. In this context, the level of trust in the data may be set lower than in the case of individually learnt data or when a digital map is created on the basis of individually ascertained data.

Such an apparatus of the communication unit for transmitting data allows warnings or instances of intervention on the basis of transmitted digital map data to be provided even when a route is first traveled by a means of transport.

In accordance with a further exemplary embodiment of the invention, an apparatus is specified, wherein the sensor unit has, for the purpose of ascertaining the topographical data for the surroundings of the means of transport, at least one sensor from the group comprising a satellite navigation receiver, a radar, possibly in conjunction with an adaptive cruise control (ACC) system, a radar sensor, a lidar sensor or laser scanner, a camera sensor system and a vehicle-to-X (C2X) communication unit.

Such an apparatus allows the ascertainment of the specific lane of the means of transport and hence of a basis for roads from satellite navigation (GPS) positions using the satellite navigation receiver.

In addition, it should be pointed out that, within the context of the present invention, GPS is used to represent a global navigation satellite system (GNNS), such as GPS, Galileo, GLONASS (Russia), Compass (China), IRNSS (India), as well as for positioning by means of WLAN, cellular radio, etc.

In addition, such an apparatus allows the creation of a lane estimation, for example by the adaptive cruise control system, which may likewise be used as a basis for recognizing a road.

Such an apparatus with a camera sensor system allows, by way of example, recognition of lanes and road signs, for example on the created digital map.

Such an apparatus with a vehicle-to-X communication unit allows recognition of positions of other vehicles and hence even untraveled roads and lanes by the means of transport.

In addition, all the aforementioned data ascertained by the sensor unit may be stored and hence cannot be lost.

In such an apparatus, the ascertained data are typically also supported by the vehicle sensor system (wheel speeds, yaw rate, steering wheel angle, etc.) and vehicle models based thereon.

In accordance with a further exemplary embodiment of the invention, an apparatus having a sensor unit is specified which has a first sensor, a second sensor and a data merger unit. In this embodiment, the first sensor and the second sensor are designed to ascertain topographical data for the surroundings of the means of transport. The data merger unit is designed to merge the ascertained data from the first sensor and the ascertained data from the second sensor in order to improve quality for the ascertained data.

Such an apparatus having a first sensor, a second sensor and a data merger unit allows surroundings data to be merged which may take account of foibles and strengths and weaknesses of the sensors for a merger, and hence the overall result of the ascertained data and also of the digital map created from the ascertained data may be improved.

In accordance with a further exemplary embodiment of the invention, an apparatus having a validation unit is specified. The validation unit is designed to validate a stored digital map on the basis of the created digital map, so that the validated digital map may be used for a safety-critical application in the means of transport without this requiring any further data.

Such an apparatus allows an individually learnt or individually created digital map to be used, by way of example, to validate an ADAS horizon provided by a navigation system, for example, and hence to provide the necessary redundancy of information for safety applications such as driver assistance systems.

In this embodiment, the stored digital map may be fed into the means of transport and stored by the manufacturer of the means of transport, for example, using a memory unit such as a CD or a USB stick or other memory unit may be transmitted to the means of transport using a transmitter, for example.

In accordance with a further exemplary embodiment of the invention, the communication unit of the apparatus is designed to receive a digital map. In this embodiment, the digital map may be sent by a transmitter, such as a manufacturer or a means of transport with an individually created digital map.

In accordance with a further exemplary embodiment of the invention, the memory unit is designed to store the topographical data ascertained by the sensor unit.

In accordance with a further exemplary embodiment of the invention, a means of transport having an apparatus for creating and storing a digital map for the means of transport according to one of the aforementioned exemplary embodiments is provided.

In accordance with a further exemplary embodiment, a method for creating and storing a digital map for a means of transport is specified with a first step for the ascertainment of topographical data for the surroundings of the means of transport by a sensor unit, a second step for the creation or improvement of the digital map from the ascertained topographical data for the surroundings of the means of transport by a creation unit, and a last step for the storage of the created digital map by a memory unit.

In accordance with a further exemplary embodiment, the method additionally involves the transmission of the topographical data and of the digital map to a suitable reception unit, such as a further means of transport or a person.

In accordance with a further exemplary embodiment, a program element is provided which, when executed on a processor of the apparatus for creating and storing a digital map for a means of transport, instructs the apparatus to perform one or more of the steps described above and below.

In accordance with a further exemplary embodiment of the invention, a computer-readable medium is provided which stores a program element which, when executed on a processor of an apparatus for creating and storing a digital map for a means of transport, instructs the apparatus to perform one or more of the steps described above and below.

The communication between the individual components of the apparatus may take place in wired fashion or, if desired, wirelessly. In this case, the relevant components are equipped with communication units.

The individual features of the various exemplary embodiments may also be combined with one another, as a result of which advantageous effects may to some extent also appear which go beyond the sum of the individual effects, even if these are not described expressly.

It should be noted that the features described here and below in respect of the apparatus may also be implemented in the means of transport and the method, and vice versa.

These and other aspects of the invention are explained and illustrated by referring to the exemplary embodiments which are described hereinafter.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Exemplary embodiments of the invention are described below with reference to the appended drawings.

The illustrations in the figures are schematic and not to scale. In the descriptions of the figures which follow, the same reference symbols are used for elements which are the same or similar.

Figure 1:
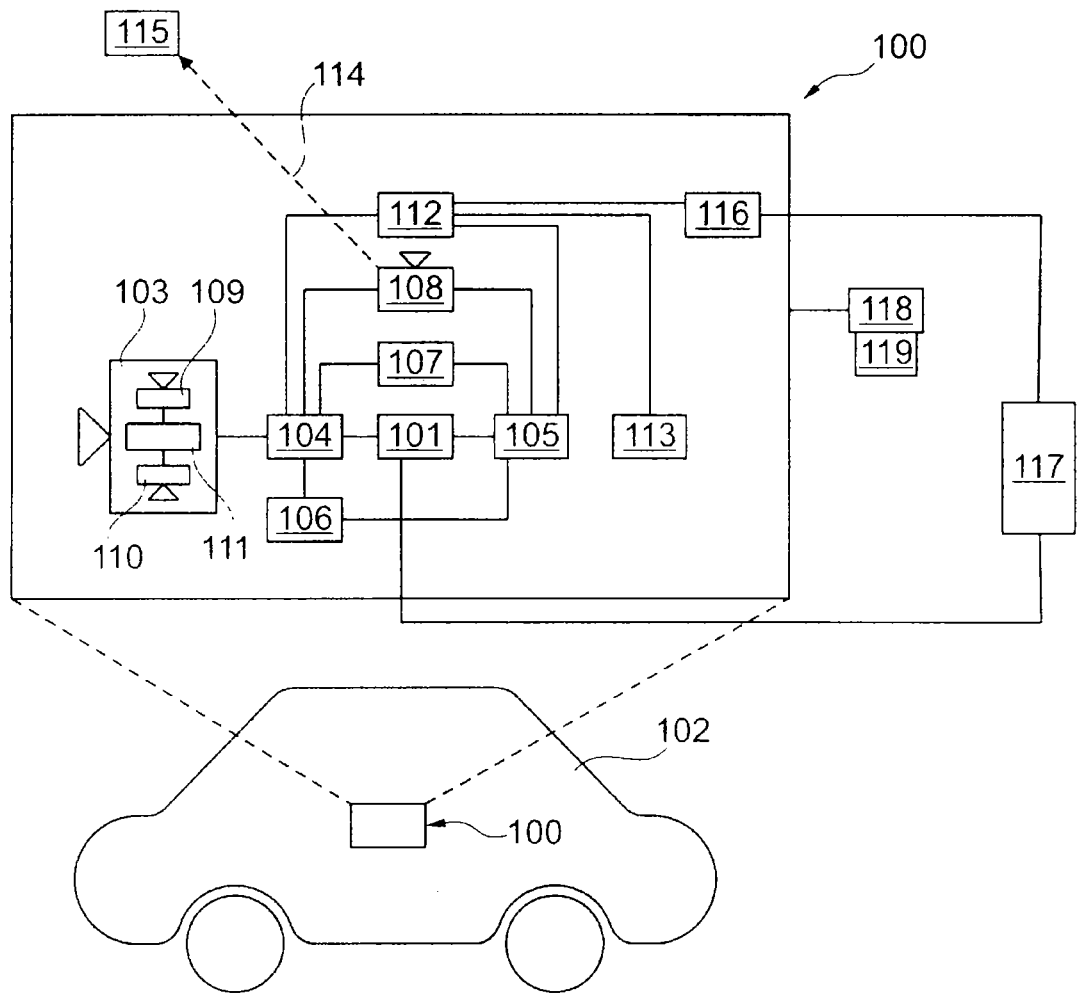
FIG. 1 shows a schematic illustration of an apparatus for creating and storing a digital map for a means of transport based on an exemplary embodiment of the invention.

FIG. 1 shows an apparatus 100 for creating and storing a digital map 101 for a means of transport 102, such as a vehicle 102. The apparatus 100 has a sensor unit 103 for ascertaining topographical data for the surroundings of the means of transport 102. The sensor unit 103 has a first sensor 109, a second sensor 110 and a data merger unit 111, wherein the first sensor 109 and the second sensor 110 are designed to ascertain topographical data for the surroundings of the means of transport 102 and the data merger unit 110 is designed to merge the ascertained data from the first sensor 109 and the ascertained data from the second sensor 110 in order to improve quality for the ascertained data. In this case, topographical data may be road signs, lanes, gradients, bends, etc. It is also possible for meteorological data to be ascertained by the sensors.

The sensor unit 103 is connected to a creation unit 104 for creating a digital map 101 from the ascertained topographical data for the surroundings of the means of transport 102. The digital map 101 is stored in a memory unit 105 which is connected to the creation unit 104.

A detection unit 106 detects a driving pattern for identifying a classified road situation for the digital map 101 and is connected to the capture unit 104 and the memory unit 105, which stores the created digital maps 101.

The apparatus 100 also has a communication unit 108 which is designed to transmit 114 the ascertained topographical data and the digital map 101 created therefrom to a suitable reception unit 115, such as a means of transport or a person. The communication unit 108 is connected to the creation unit 104 and the memory unit 105 and may access created digital maps 101. The communication unit 108 is likewise designed to receive topographical data and maps from a transmitter such as a further means of transport.

The apparatus also has a validation unit 112 which validates a stored digital map 113 on the basis of the created digital map 101, so that the validated digital map 116 may be used for a safety-critical application 117 in the means of transport 102 without this requiring further data. In this embodiment, the stored digital map 113 may be stored in the means of transport by a manufacturer using a CD, for example.

FIG. 1 also shows a quality assessment unit 107 which comprises the apparatus 100 and which is designed to assess the quality of the ascertained topographical data for the surroundings of the means of transport 102 and also the digital map created therefrom. The quality assessment unit 107 is connected to the creation unit 104 and the memory unit 105, which provides stored individually created digital maps.

In addition, FIG. 1 shows a program element for instructing the apparatus 100 to create and store a digital map 101 for the means of transport 102 when it is executed on a processor 118, and also a computer-readable medium 119 which stores a program element which, on the processor 118 of the apparatus 100, is designed to create and store a digital map 101 for the means of transport 102.

Figure 2:
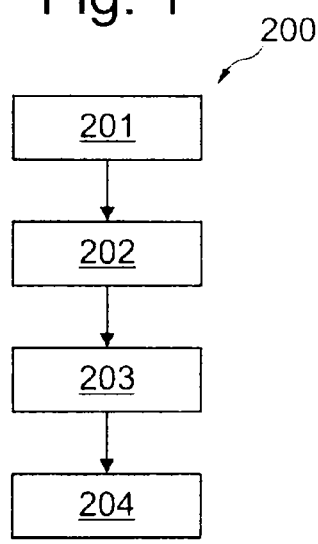
FIG. 2 shows a flowchart for a method for creating and storing a digital map for a means of transport based on an exemplary embodiment of the invention.

FIG. 2 shows a flowchart for a method 200 for creating and storing a digital map for a means of transport. The method 200 has the following steps: in step 201, topographical data for the surroundings of the means of transport are ascertained by a sensor unit. In step 202, the digital map is created from the ascertained topographical data for the surroundings of the means of transport by a creation unit. Finally, the created digital map is then stored by a memory unit in step 203. In a further last step 204, the topographical data and the digital map are transmitted to a suitable reception unit.

Two further exemplary embodiments of the invention are described below:

In accordance with a further exemplary embodiment of the invention, an apparatus for creating and storing a digital map for a means of transport is specified which may be implemented for subsequently described use for a means of transport.

A vehicle with an apparatus as described above is traveling on a previously unknown route section on which no warnings can be given and also an ADAS cannot be supplied with map data. Satellite navigation (GPS) and peripheral sensors are used for the apparatus to create and store a first version of a digital map about this route.

On the inbound journey, map data (from the outbound journey) are then already available for the means of transport. These digital map data may be used for warnings and may be provided for ADAS. In addition, the GPS data and peripheral sensor data are used to refine the map data. Since the journey home by a user of a vehicle usually takes place at a later time, for example in the evening, visibility conditions are poor, and a warning on the basis of map data is important for the inbound journey. In addition, it is conceivable for virtually absent traffic and the tiredness of a driver to provoke the driver to misjudge his own speed and to overestimate his own driving skills.

While a user is traveling on holiday, the route traveled is normally completely new for the driver and the vehicle, and therefore assistance is important. It would therefore seem appropriate for map data to be provided for these routes by a third party. These map data are incorporated into the individually learnt digital map inventory, but are accorded a relatively low trustworthiness by the apparatus. This level of trustworthiness maybe refined by the driver at the time of the import of map data from a third party, since he may specify that he considers some sources of the map material to be more reliable than others, for example. However, the level of trust may never reach the level of trust for individually learnt data for creating digital maps. The import source used may be data from friendly vehicles, as well as data provided centrally by the vehicle manufacturer or service providers.

These data may reach the vehicle either via wireless connections such as Bluetooth, ZigBee, DSRC, WLAN, WiMax, cellular radio, etc., for example from a service provider or from an Internet portal, or via data storage media (CD, USB stick).

If the data are coming from another vehicle, the driver may decide whether only data which the other vehicle has itself used are interchanged or whether data which the other vehicle has likewise only received are also forwarded. This decision may likewise be made by the apparatus itself.

In accordance with a further exemplary embodiment of the invention, the data from third parties may be used to obtain warnings and to provide ADAS with map data when a route is actually first traveled by the vehicle. When the route has been traveled for the first time, individually learnt data are then available. The result is virtually no difference over the previously described case without extraneous data.

Although the invention has been described with reference to exemplary embodiments, various changes and modifications may be made without departing from the scope of protection of the invention. The means of transport with the apparatus for creating and storing a digital map for the means of transport may be in the form of a land vehicle, in the form of an aircraft such as an airplane or a helicopter, and in the form of a water or rail vehicle.

In addition, it should be pointed out that "comprising" or "having" does not exclude other elements or steps, and "a" or "an" does not exclude a large number. The apparatus may thus have, by way of example, more than one sensor unit, more than one creation unit, more than one memory unit, more than one detection unit, more than one quality assessment unit, more than one communication unit, and the sensor unit may have more than one first sensor, more than one second sensor and more than one data merger unit.

Furthermore, it should be pointed out that features or steps which have been described with reference to one of the above exemplary embodiments may also be used in combination with other features or steps from other exemplary embodiments described above.

The invention claimed is:

1. An apparatus in a vehicle for creating and storing a digital map for the vehicle, said apparatus comprising:
  a sensor unit configured to ascertain topographical data for the surroundings of the vehicle;
  a communication unit configured to receive map data from a third party;
  a creation unit configured to create the digital map from the ascertained topographical data for the surroundings of the vehicle,
  wherein the creation unit associates a level of trust to the map data received from the third party, such that the use of the third party map data in the creation of the digital map is based on the level of trust, the level of trust including at least three levels; and
  a memory unit configured to store the created digital map.

2. The apparatus of claim 1 wherein the apparatus is configured to iteratively create the digital map.

3. The apparatus of claim 1 further comprising a detection unit configured to detect a driving pattern for identifying a classified road situation for the digital map.

4. The apparatus of claim 1 further comprising a quality assessment unit configured to assess the quality of the ascertained topographical data for the surroundings of the vehicle and also the digital map created therefrom.

5. The apparatus of claim 1 wherein the created digital map is used by a driver assistance system.

6. The apparatus of claim 1 further comprising a communication unit configured to transmit the topographical data and the digital map to a suitable reception unit.

7. The apparatus of claim 1 wherein the sensor unit includes, for the purpose of ascertaining the topographical data for the surroundings of the vehicle, at least one sensor from the group comprising a satellite navigation receiver, a radar in conjunction with an adaptive cruise control system, a radar sensor, a lidar sensor or laser scanner, a camera sensor system and a vehicle-to-X communication unit.

8. The apparatus of claim 1, wherein the sensor unit includes:
  first and second sensors configured to ascertain topographical data for the surroundings of the vehicle; and
  a data merger unit configured to merge the ascertained data from the first sensor and the ascertained data from the second sensor in order to improve quality for the ascertained data.

9. The apparatus of claim 6, wherein the communication unit is configured to receive topographical data and maps from a transmitter.

10. The apparatus of claim 1, further comprising a validation unit configured to validate a stored digital map on the basis of the created digital map, so that the validated digital map can be used for a safety-critical application in the vehicle without this requiring any further data.

11. A vehicle comprising an apparatus for creating and storing a digital map for the vehicle as claimed in claim 1.

12. A method for creating and storing a digital map for a vehicle, said method comprising the following steps:
- ascertaining, by a processor, topographical data for the surroundings of the vehicle;
- receiving, by the processor, map data from a third party;
- creating, by the processor, the digital map from the ascertained topographical data for the surroundings of the vehicle, and the map data received from the third party;
- associating, by the processor, a level of trust to the map data received from the third party, such that the use of the third party map data in the creation of the digital map is based on the level of trust, the level of trust including at least three levels; and
- storing the created digital map in a memory unit.

13. The method as claimed in claim 12, further comprising the step of transmitting the topographical data and the digital map to a suitable reception unit.

14. A non-transitory computer-readable medium which stores a program element which, when executed on a processor of an apparatus for creating and storing a digital map for a vehicle, instructs the apparatus to perform the following steps:
- ascertain, by a sensor unit, topographical data for the surroundings of the vehicle;
- receiving, by a reception unit, map data from a third party;
- create, by a creation unit, the digital map from the ascertained topographical data for the surroundings of the vehicle, and the map data received from the third party;
- associate, by the creation unit, a level of trust to the map data received from the third party, such that the use of the third party map data in the creation of the digital map is based on the level of trust, the level of trust including at least three levels; and
- store the created digital map by a memory unit.

15. The apparatus of claim 1, wherein the level of trust is adjusted by the driver.

16. The apparatus of claim 1, wherein map data having a low level of trust and map data having a high level of trust are both used in creation of the digital map.

* * * * *